(12) United States Patent
Duevel et al.

(10) Patent No.: US 8,868,830 B2
(45) Date of Patent: Oct. 21, 2014

(54) PRACTICAL CODE LIST CACHE FOR VALUE HELP

(75) Inventors: Olaf Duevel, Mannheim (DE); Udo Klein, Wörth (DE); Friedhelm Krebs, Wiesloch (DE); Steffen Riemann, Rauenberg (DE); Bernhard Thimmel, Edingen-Neckarhausen (DE)

(73) Assignee: SAP AG, Walldorf (DE)

( * ) Notice: Subject to any disclaimer, the term of this patent is extended or adjusted under 35 U.S.C. 154(b) by 462 days.

(21) Appl. No.: 13/196,865

(22) Filed: Aug. 2, 2011

(65) Prior Publication Data

US 2013/0036252 A1 Feb. 7, 2013

(51) Int. Cl.
*G06F 12/16* (2006.01)
*G06Q 10/10* (2012.01)
*G06Q 30/00* (2012.01)
*G06F 3/01* (2006.01)

(52) U.S. Cl.
CPC ...... *G06F 3/01* (2013.01); *G06Q 10/10* (2013.01); *G06Q 30/00* (2013.01)
USPC ........... 711/113; 711/114; 711/118; 711/162; 714/6.2

(58) Field of Classification Search
USPC ............ 711/113, 114, 118, 162; 714/6.2
See application file for complete search history.

(56) References Cited

U.S. PATENT DOCUMENTS

| 2002/0009285 A1* | 1/2002 | Safadi et al. ............... 386/46 |
| 2004/0117441 A1* | 6/2004 | Liu et al. .................... 709/203 |
| 2010/0211731 A1* | 8/2010 | Mittendorff et al. ........ 711/113 |

* cited by examiner

*Primary Examiner* — Jae Yu
(74) *Attorney, Agent, or Firm* — Mintz Levin Cohn Ferris Glovsky and Popeo, P.C.

(57) ABSTRACT

Methods and apparatus, including computer program products, are provided for providing value help. In one aspect, there is provided a computer-implemented method. The method may include receiving, at a code list provider, a request from a user interface for code list value help; determining, based on the request, whether to access at least one of a cache and a secondary storage; accessing, by the code list provider, a cache including at least a first code list, the cache implemented in memory, when the determination results in access to the cache; accessing a secondary storage including at least a second code list, when the determination results in access to the secondary storage; and sending, by the code list provider, at least one of the first code list and the second code list to a user interface to enable the user interface to provide code list value help. Related apparatus, systems, methods, and articles are also described.

17 Claims, 6 Drawing Sheets

FIG. 2B

PRACTICAL CODE LIST CACHE FOR VALUE HELP

FIELD

The present disclosure generally relates to providing value help including a code list to a user interface.

BACKGROUND

When a user at a user interface accesses an application at a server, the user may input one or more values at the user interface. However, if the user needs assistance, the user may obtain "value help." For example, the user may move an indicator over an element and a value help function may provide value help, i.e., help information for the element at the user interface. A classic example is in the case of a flight reservation system, the user may select a destination city and the value help may provide, autonomously, or at the request of a user (e.g., selecting function F4), a value help list of all possible destination cities. Specifically, as a user types in the letter D in an input for the destination city, a list of cites, such as Denver, Detroit, Dansville, is provided as a value help drop down list. If the user enters a second value "a," the list may be filtered to all cities starting with "DA," and so forth as additional values are input. If a user selects a city in the drop down list, the selected city from the drop down list becomes the input at the user interface. Thus, value assists the user performing tasks via the user interface.

SUMMARY

In one aspect, there is provided a computer-implemented method. The method may include receiving, at a code list provider, a request from a user interface for code list value help; determining, based on the request, whether to access at least one of a cache and a secondary storage; accessing, by the code list provider, a cache including at least a first code list, the cache implemented in memory, when the determination results in access to the cache; accessing a secondary storage including at least a second code list, when the determination results in access to the secondary storage; and sending, by the code list provider, at least one of the first code list and the second code list to a user interface to enable the user interface to provide code list value help.

In some implementations, one of more variations may be made as well as described in the detailed description below and/or as described in the following features. The request may include a value help request for an element at the user interface. The memory may include least one of a random access memory, a dynamic random access memory, and a flash memory. The secondary storage may include a disk-based storage mechanism. The cache may include at least about 70% of information for providing code lists to the code list provider to enable retrieval directly from the cache, and the secondary storage may include remaining information for providing code lists to the code list provider. Code list value help including at least one of the first code list and the second code list may be generated for presentation at the user interface. The code list value help may include a code header, a code value, and a code description. The code list value help may include a list of codes each representing value help for an item at the user interface, and the cache may include a plurality of code lists each including a code header, a code value, and a code description. The plurality of code lists may be replicated from a persistent repository into the cache to enable access to the plurality of code lists by the code list provider accessing the cache. At least one of the code lists may be selected based on a switch table.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIGS. 2A-B depicts a user interface including code list value help;

Figure 1:
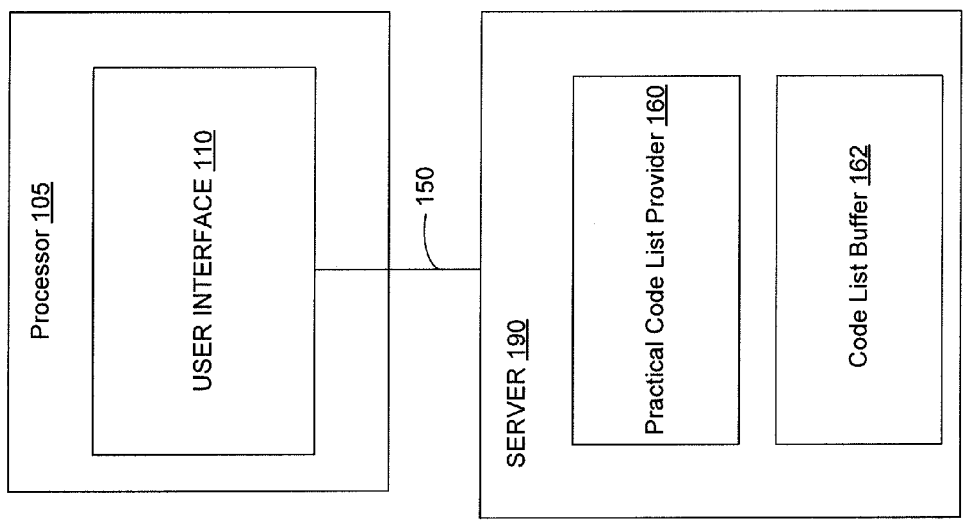
FIG. 1 depicts a block diagram of a system for providing value help including a code list.

Like labels are used to refer to same or similar items in the drawings.

DETAILED DESCRIPTION

FIG. 1 depicts a system 100 including a processor 105 and a server 190, which are coupled by a network 150. The processor 105 further includes a user interface 110. Server 190 further includes a code list provider 160 (labeled practical code list provider) and a code list buffer 162.

The processor 105 may be implemented as any processor capable of executing an application, such as user interface 110, and the like. For example, the processor 105 may include at least one processor, such as a central processing unit, and at least one memory (which may include code and/or data). Examples of processor 105 include a computer, a computing device, a tablet computer, a mobile wireless device, a blade server, or any other suitable processing device.

The user interface 110 may be implemented as any type of interface that enables interaction with aspects of system 100, including server 190, code list provider 160, and code list buffer 162. For example, user interface 110 may be implemented as a web browser (which may include one or more plug-ins), a client application, a thin client, and any other interface mechanism.

The network 150 may be any type of wired and/or wireless mechanism and may include, alone or in any suitable combination, the Internet, a telephony-based network, a local area network (LAN), a wide area network (WAN), a dedicated intranets, wireless LAN, an intranet, a public land mobile network, a wireless network, a bus, and/or any other communication path.

The server 190 may include at least one processor and at least one memory (which may include code and/or data). The at least one memory may be implemented as any type of storage mechanism including random access memory, read only memory, FLASH memory, and/or any other mechanism for storing data. The server 190 may be implemented as one or more of the following: a computing device, a computer, a processor, a blade server, or any other suitable processing device.

The server 190 may execute one or more applications, such as code list provider 160. Code list provider 160 may generate a code list (e.g., a list of code) and provide the code list to a user interface, such as user interface 110. Moreover, the code list provider 160 may provide the code list as part of a value help function at user interface 110. For example, a user may move an indicator over an element of user interface 110, and value help may present, either autonomously or when selected (e.g., selecting F4), a code list as value help for that element of user interface 110.

The code list buffer 162 may provide code list information to enable the code list provider 160 to provide value help including the code list. In some implementations, the code list buffer 162 stores the code list(s) in a database and/or table. Furthermore, the stored code lists may be buffered in memory, such as readily accessible random access memory, dynamic RAM, and the like, rather than store the code list in slower, longer-term, persistent storage, such as a hard drive and the like. In some implementations, the stored code lists are stored using tables specific to a client (e.g., a tenant) and in tables that are common to a plurality of clients.

Figure 2A:
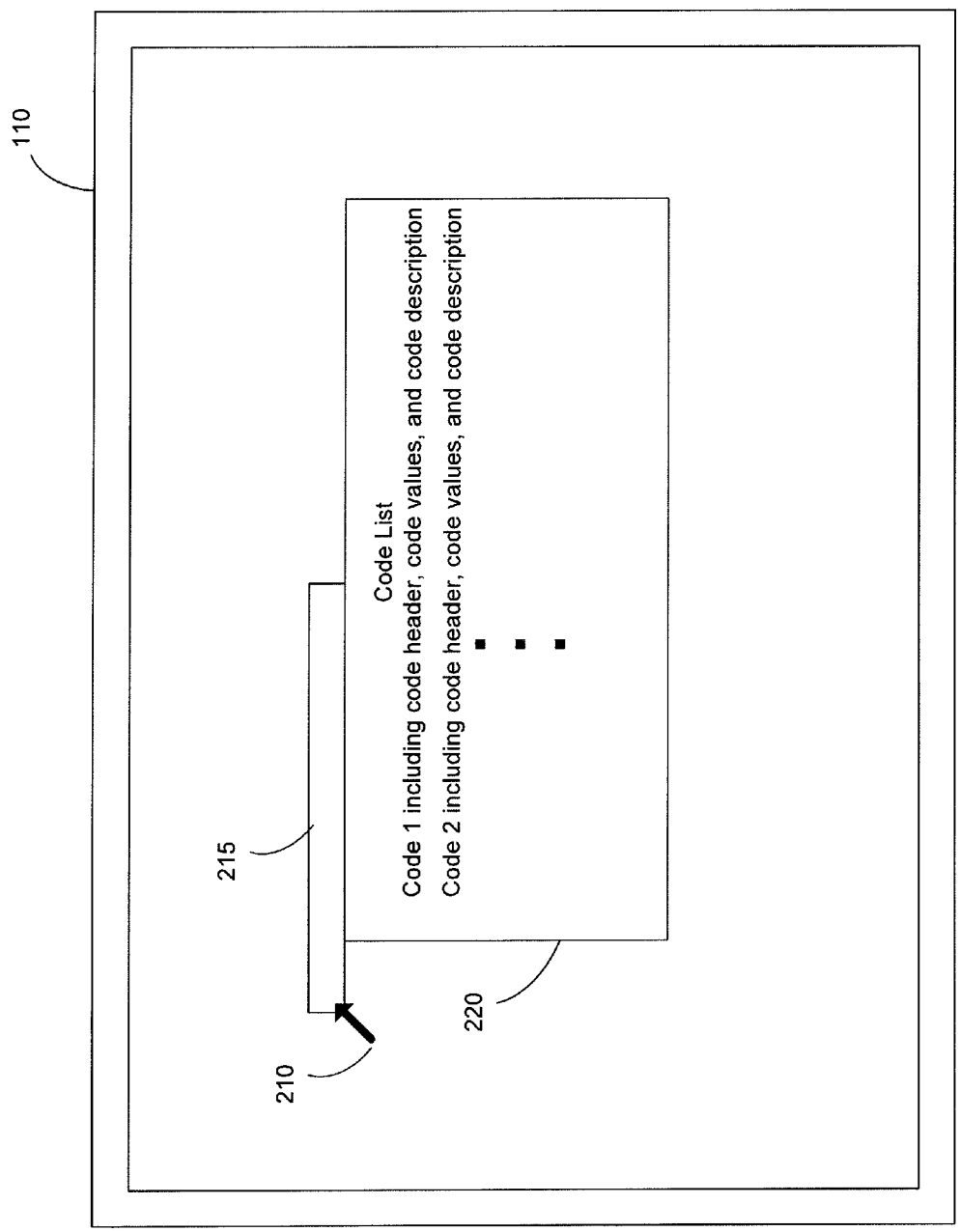

FIG. 2A depicts an example implementation of a page presented at user interface 110. Specifically, FIG. 2A depicts an indicator 210 pointing at an input element 215, and value help including a code list 220 being presented. The code list 220 includes a code header, code values, and code description. The code header refers to a description of the type of code. The code values refer to code values of the code lists and contexts in the code type table. The code description refers to a general description of the code. Examples of the code header, code value, and code description are provided below with respect to FIG. 5.

To further illustrate the code header, code values, and code description, suppose there is a "document status code," which can have the values 1, 2, and 3 with the semantics of 1 being equated to new, 2 being equated to released, and 3 being equated to obsolete. Then, the code header would include a code type value to represent these codes. For example, a code type 42 may be configured to correspond to a code value table having 3 entries for this code type: 42 1; 42 2; and 42 3. The semantics for these 3 entries are as follows: 42 1 "document status code new;" 42 2 "document status code—released;" and 42 3 "document status code—obsolete." The code descriptions may be language dependent and implemented as follows: 42 1 EN new; 42 1 DE neu; 42 2 EN released; 42 2 DE freigegeben; 42 3 EN obsolete; and 42 3 DE obsolete, wherein "EN" corresponds to English and "DE" corresponds to German. In some implementations, a duplicate, second set of tables (which have similar semantics) may be used to add an additional key column to allow client-specific codes or code variations.

Figure 2B:
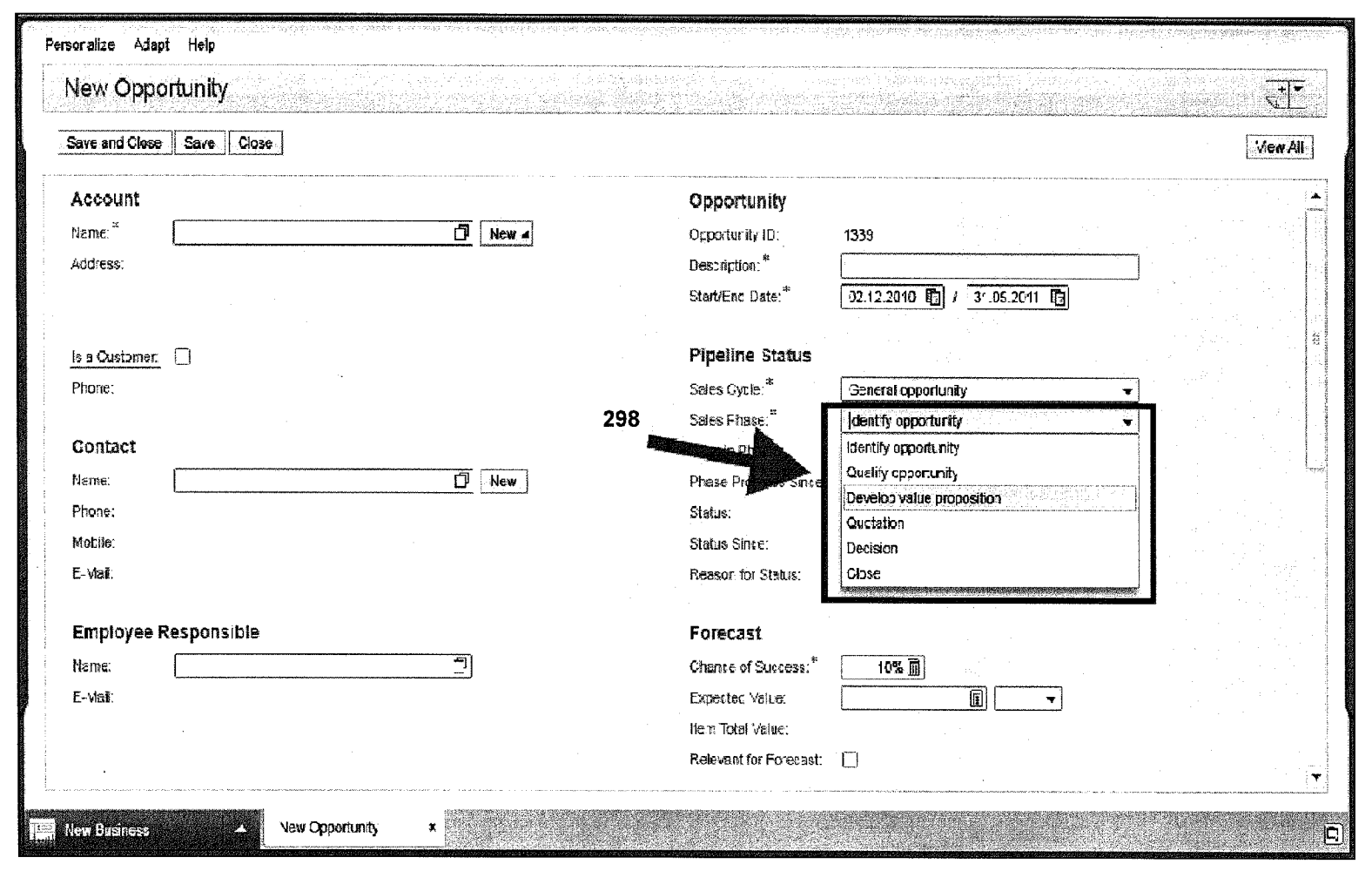

Referring again to FIG. 2A, code 1 and/or code 2 may be selected by the user (e.g., a developer) to enable the user to use the selected code at input element 215. For example, the user may be configuring a system, such as a database, application, enterprise resource planning system, and the like. In this example, the user may be customizing the configuration of the system by selecting one or more pieces of data or code, such as with code 1 and/or code 2. Thus, the code list 220 is provided to the user when completing that task. For example, the above-noted example for code type 42 may be implemented as a drop down box to allow a user to select the status of a document. FIG. 2B depicts another example of a code list in a drop down box 298 including code-based help for the sales phase.

Figure 3:
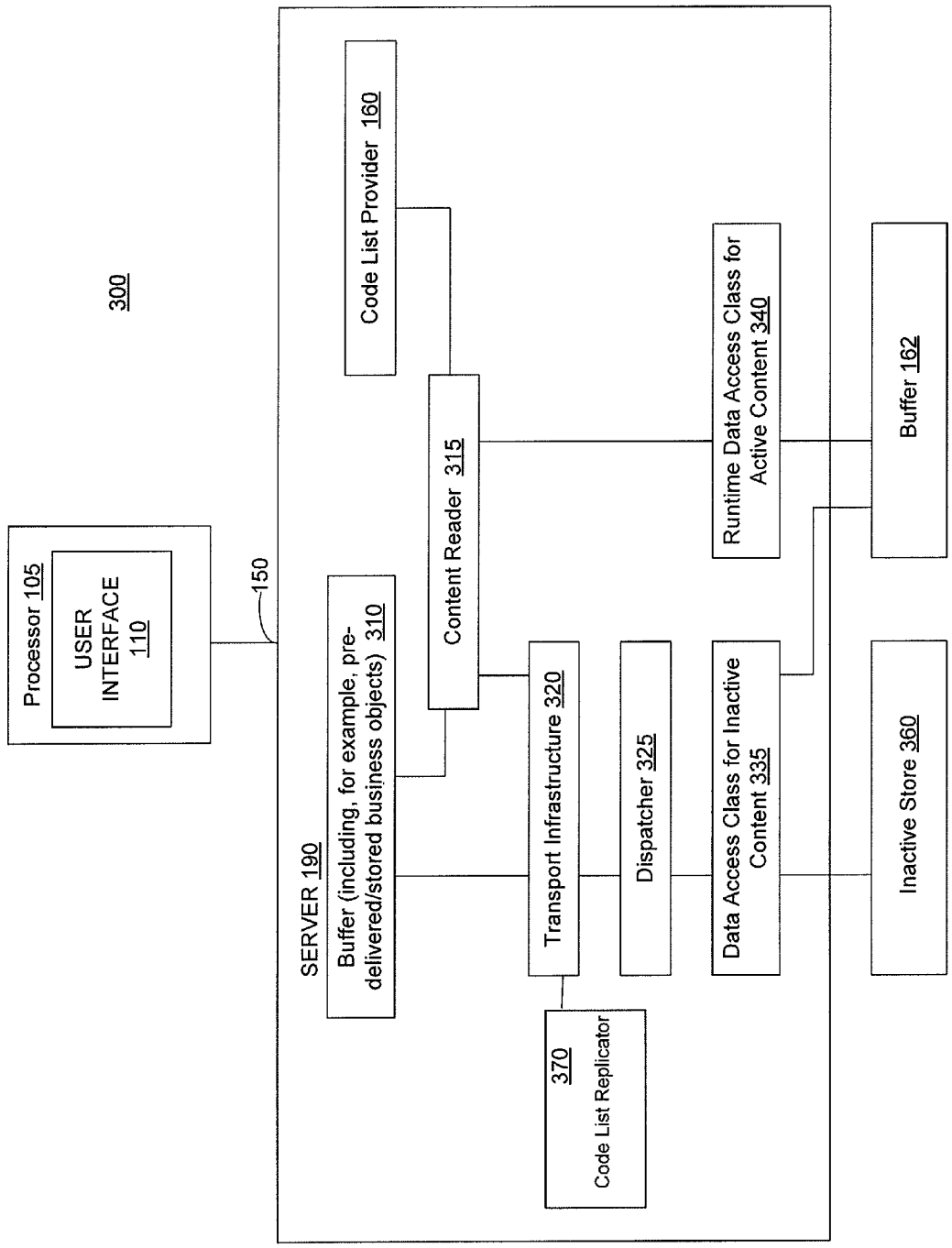
FIG. 3 depicts another block diagram of a system for providing value help including a code list.

FIG. 3 depicts a system 300 for providing a code list as part of, for example, value help function. The system 300 is similar to system 100 in some respects but includes a content reader 315, which provides direct access to most of the code list information stored in buffer 162 and, for the content not stored in buffer 162, accesses so-called "inactive" storage 360 which includes the code lists information not stored in buffer 162.

When an operation at the user interface causes a request for value help to be sent from the user interface 110 to the code list provider 160, the code list provider 160 forwards the request to a content reader 315. The content reader 315 reads the request for a code list and then determines whether the request corresponds to code list information stored in buffer 162 or code list information which is determined from business configuration data, such as business objects. For example, the content reader 315 may read a flag in the request indicating that the code list information is stored in buffer 162, the content reader 315 may include information, such as for example, a table, indicating what code list information is stored in buffer 162.

If stored in buffer 162, the content reader 315 accesses buffer 162 via a data access class 340. The buffer 162 includes the code list store as described above with respect to FIG. 1. In some implementations, the data access is performed during runtime. Moreover, the buffer 162 may, in some implementations, keep the code list in memory, such as random access memory (RAM), dynamic RAM, Flash memory, rather than in persistent storage, such as disk-based drives. Furthermore, the system 300 may be implemented to include about at least 70% of the code list information likely to be used and separated by type in buffer 162. Although the system 300 may also be implemented to include about at least 80%, 85%, and/or 90% of the code list information likely to be used and separated by type in buffer 162. In some implementations, storing in buffer 162 at least about 70%, 80%, 85%, and/or 90% of the code list information likely to be used at user interface 110 enhances the performance (e.g., access times, responsiveness, etc.) of system 300, when compared to storing all of the code list information in buffer 162 (although system 300 may instead be implemented with 100% of the code list information stored in buffer 162).

If content reader 315 determines that the request for a code list corresponds to business configuration data, such as business objects, the content reader 315 may access a buffer 310 to retrieve such data which is ready for use (e.g., pre-configured business objects, pre-delivered business objects, etc.). The content reader 315 then retrieves the code list information from the data contained in the business objects retrieved from buffer 310. However, if the buffer 310 does not have the data required by content reader 315, the content reader 315 may access a transport infrastructure 320 to search for the business configuration data, such as for example business objects. The transport infrastructure 320 may access a dispatcher 325 which forms a request for the business configuration data, such as business objects, and then dispatches the request to a data access class for inactive content 335. The data access class for inactive content 335 then retrieves the business configuration data, such as business objects, from an inactive store, which may be implemented as a persistent storage, such as for example a disk-drive and the like.

The retrieved business configuration data, such as business objects, may be provided to content reader 315, which may extract the code list information from business configuration data, such as business objects. The content reader 315 may then provide the code list information to code list provider 160 and user interface 110 for presentation in a code list. In some implementations, inactive store 360 may also include code which may take up a large amount of memory, such as code lists that are too long, code lists having a long key value, and/or and code lists having a long description.

Figure 4:
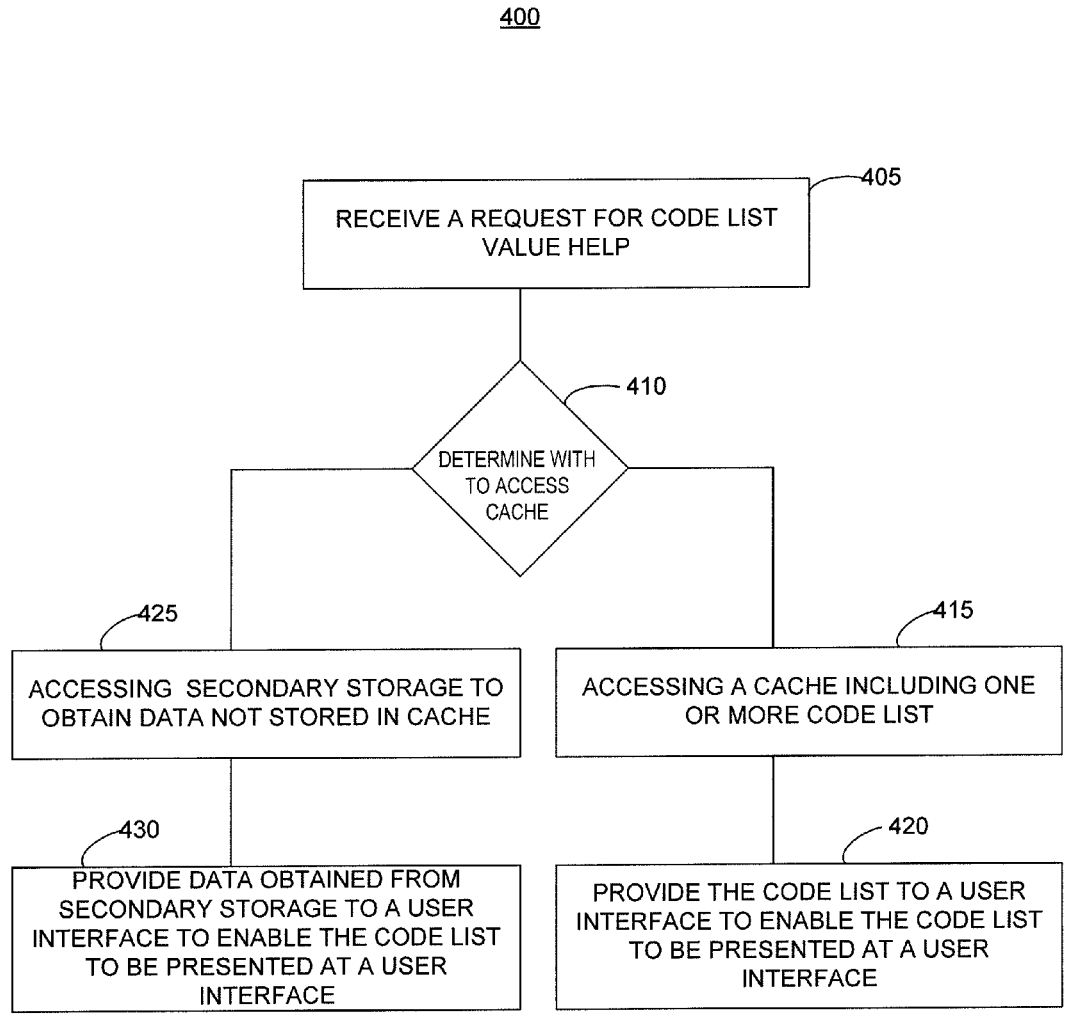
FIG. 4 depicts a process for providing code list value help.

FIG. 4 depicts a process 400 for providing value help including a code list.

At 405, a value help request is received for a code list. For example, code list provider 160 may receive a request for value help including a code list (also referred to herein as "code list value help"). The request may be received as a message indicating which of the plurality of elements at user interface requires the code list value help. For example, a first element at the user interface may have a first code list value help, and a second element at the user interface may have a second code list value help. Consequently, the request includes an indication of whether the value help is for the first element or the second element.

At 410, a determination is made whether to access cache for the code list information. For example, content reader 315 may determine whether to directly access code list information stored in cache, such as buffer 162 which may store most of the code list information. The content reader 315 may determine that the code list information need for the request received at 405 is not stored in cache, such as buffer 162, but instead stored in inactive store 360. For example, the code list information may be contained in business configuration information, such as business objects, in which case the code list information is obtained from inactive store 360.

When the code list information is accessible from cache, such as buffer 162, the cache is accessed, at 415, to obtain the code list value help. For example, the content reader 315 may access runtime data access class for active content 340 and cache, such as buffer 162, to obtain the code list information. As noted, the buffer 162 may be implemented in memory to enable rapid retrieval of code list information, when compared to retrieval from other mechanisms, such as persistent storage.

At 420, the code list is provided to a user interface, so that the code list is presented as value help at the user interface. For example, the content reader 315 provides the code list information (including the code list) to the code list provider 160, which in turn sends the code list to user interface 110, where the code list is presented as value help for an element of the user interface 110 as depicted at FIGS. 2A-B.

When the code list information is not accessible from buffer 162, secondary storage mechanisms may be accessed at 425. For example, the content reader 315 may access a first secondary store, such as buffer 310, to retrieve data which may include pre-configured business objects, pre-delivered business objects, and the like. The content reader 315 may then retrieve the code list information from the data contained in the business objects retrieved from buffer 310, but if the buffer 310 does not have the data required by content reader 315, the content reader 315 may access a transport infrastructure 320 to search for the business objects. The transport infrastructure 320 may access a dispatcher 325 which forms a request for the business objects. The dispatcher 325 sends the request to a data access class for inactive content 335, which retrieves the business objects, from another secondary storage mechanism, such as inactive store 360.

At 430, the code list information obtained from secondary storage is provided to a user interface, so that the code list is presented as value help at the user interface. For example, the business objects obtained from secondary storage, such as inactive store 360, may be provided to content reader 315, which may extract the code list information from business configuration data, such as business objects. The content reader 315 may then provide the code list information to code list provider 160 and user interface 110 for presentation in a code list. The secondary store, such as inactive store 360, may also provide code lists that are relatively large and thus take up a relatively large amount of memory (such as code that is too long, code list having a long key value, and code lists having a long description).

Figure 5:
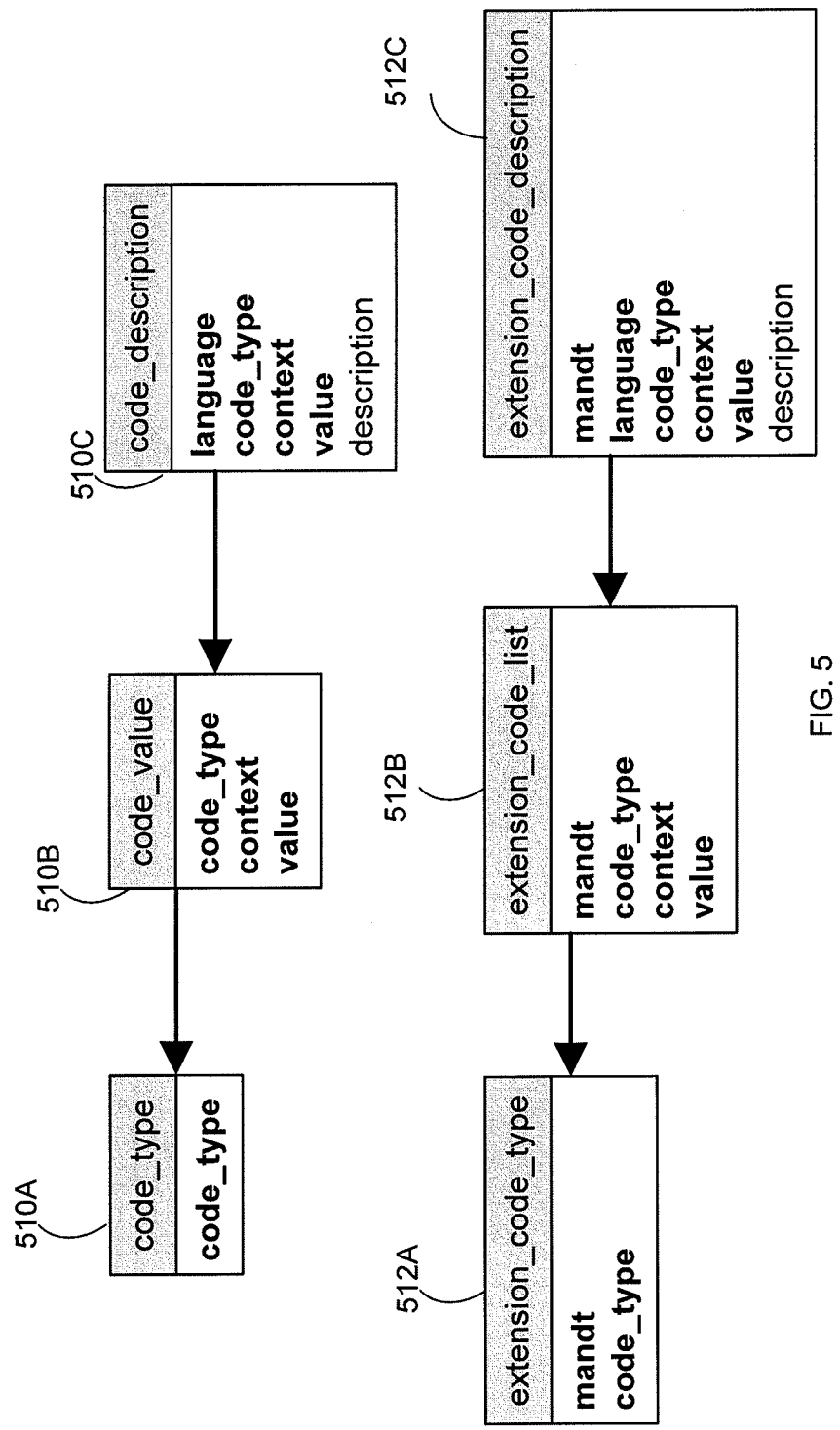
FIG. 5 depicts tables storing code list information.

FIG. 5 depicts an example implementation of the code list information stored by type in buffer 162. Specifically, the code list information is stored in tables based on code type 510A. The code_type table 510A may include a list of all supported code types and code lists. The key to table 510A may be an internal, short name of the code list, and the table 510A may be buffered in memory at code list buffer 162. The excluded flag indicates if a code is to be excluded from the code list value help mechanism of buffer 162, although the default is typically to include the code in the code list value help mechanisms described herein. In some implementations, the code list provider 160 may include a mechanism for programmatically adding or deleting code from the code list at code list buffer 162. For example, if the tables in buffer 162 become full, or approach a threshold, a code may be excluded using the exclude flag at table 510A from the code list stored at buffer 162. In this example, the excluded code may be stored in secondary storage, such as inactive store 360.

The code value table 510B includes all code values of all code lists and contexts in the code type table. The table 510B may be buffered at 162 with one or more key fields. The disabled field (which is included in table 510B) indicates that a code value is disabled (e.g., the code value may be still be used for presentation and query purposes but not enabled for entry at the user interface for a new task or document). To illustrate by an example, suppose it is Germany in the year 1990 and the local currency is the "Deutsche Mark" but in 2010, the local currency is the Euro. In this example, the respective code values are DEM and EUR. However, suppose an old invoice from 1990 is presented at a user interface, the currency code will be DEM and its description would be in the system to enable presentation and query of the DEM currency but the DEM currency is not to be entered in 2010 as a new value for any new tasks/documents.

The code description table 510C includes descriptions of some, if not all, of the code values. The table 510 may be buffered at 162 with one or more key fields (e.g., three key fields). The code description table 510C contains the disabled field to avoid retrieval of that field from the value table 510B.

The code description table 510C also includes a language field, which is the first key field. Using the language field as a key field may be realized as the language filed is very stable during a user session, and the language filed does not typically change among users (e.g., most users will log in to a given system using a common language). Hence, the language field was placed before the key list to ensure that the language field will be subject to the buffer 162.

In some implementations, the tables 510A-C are replicated with an additional key field for tenant specific settings. Tenant specific settings are specific to a given client or user while common settings are shared among most, if not all, tenants of a system. For example, tenant code header tables may have the form of table 512A, tenant code value tables may have the form of table 512B, and tenant code description tables may have the form of table 518C. For example, code list provider 160 may lookup whether the extension code type table 512A at buffer 162 includes an entry for a desired code for a code list. If so, the tenant specific tables are accessed, otherwise the generic tables 510A-C are accessed to find the desired code.

In some implementations, the extensibility of code lists may be controlled using a switch table framework. This approach would include a lookup to determine whether a corresponding switch for a code is active and then using the "active" information to determine where to retrieve the codes.

For example, active code list information may be retrieved from buffer 162, while inactive code may be retrieved from inactive store 360.

The code list data may be replicated from a persistent repository into memory at code list buffer 162. If there are any changes to the underlying code list information, the changes may be replicated to buffer 162. Thus, any changes to the data are replicate when a change is made (e.g., upgrades, transports, deployment, etc). For example, the transport infrastructure may include a code list replicator 370, which may track underlying code list information caused by a change. In some implementations, the code list replicator 370 detects whether code lists are not suitable for replication and excludes them from replication. For example, a code list having too many entries or too much content (which exceeds a predefined limit in buffer 162) might be excluded from replication into the buffer 162. If a code list was previously replicated and then requires exclusion, the code list provider 160 may delete the obsolete code list entries in buffer 162.

In some implementations, tenant specific tables and common tables (which are independent of any given client) are selected during replication by code list replicator 370 in accordance with the switches noted above. For example, a client dependent view, T1, is generated, such as Table 1 below, by way of a client independent table, T2, containing all code values, such as Table 2 below and a client dependent table, Switch table, TS, may contain the active switches per client, such as Table 3 below. These tables are used to determine whether a code value is provided in a given client, such as client 001.

TABLE 1

| Client dependent View T1 | |
| --- | --- |
| Client | Code |
| 001 | 1 |
|  | 2 |
| 002 | 1 |
|  | 2 |
| 003 | 1 |
|  | 2 |
|  | 3 |

TABLE 2

| Client independent Table T2 | |
| --- | --- |
| Code | Switch |
| 1 | initial |
| 2 | Initial |
| 3 | switch A |

TABLE 3

| Switch Table, TS | |
| --- | --- |
| Client | Switch |
| 003 | Switch A |
| 003 | Initial |
| 002 | Initial |
| 001 | Initial |

In the examples of Tables T1, T2, and TS, switch A is active only for client 003. Thus, client 001 and client 002 would be provided with code 1 and code 2, and client 003 would be provided with code 1, 2, and 3.

The switch table, TS, enables client specific filtering. Referring again to the above example using the code type 42, suppose a customer wants to include an additional code, the codes would be as depicted at Table 4. The new tenant specific code, 42 4 "document status code—ready for review," is not be visible to other tenants (or customers), so a tenant specific extension is used to isolate the client specific code, 42 4, to a given client. The use of a switch table, such as Table 3, may also save memory when compared to replicating the codes at each client table.

TABLE 4

| Code list including client independent and client dependent values |
| --- |
| 42 1 "document status code - new" |
| 42 2 "document status code - released" |
| 42 3 "document status code - obsolete" |
| 42 4 "document status code - ready for review" |

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Furthermore, the phrases "based on" and "based on at least" are used interchangeably herein as both phrases are equivalent. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A method comprising:
   receiving, at a code list provider at a server, a request from a user interface for code list value help;
   determining, based on the request, a location for the code list value help in at least one of a cache or a storage source for one or more business objects, wherein when the determining indicates the storage source for one or more business objects, the determining further comprises determining whether the one or more business objects are active and stored in a buffer or inactive and stored in a persistent storage, wherein the cache is implemented in memory, wherein the cache includes at least 70% of information for providing code lists to the code list provider to enable retrieval directly from the cache, and wherein the secondary storage includes remaining information for providing code lists to the code list provider;
   accessing the cache including a first code list, when the determination results in access to the cache;
   accessing the buffer including a second code list, when the determination results in access to the buffer;
   accessing the persistent storage including a third code list, when the determination results in access to the persistent storage; and
   sending, by the code list provider, at least one of the first code list, the second code list, or the third code list to the user interface to enable the user interface to provide code list value help.

2. The computer-readable medium of claim 1, wherein the request includes a value help request for an element at the user interface.

3. The computer-readable medium of claim 1, wherein the memory comprises at least one of a random access memory, a dynamic random access memory, or a flash memory.

4. The computer-readable medium of claim 1, wherein the secondary storage comprises a disk-based storage mechanism.

5. The computer-readable medium of claim 1, further comprising:
   generating, for presentation at the user interface, code list value help including at least one of the first code list or the second code list.

6. The computer-readable medium of claim 1, wherein the code list value help comprises a code header, a code value, and a code description.

7. The computer-readable medium of claim 1, wherein the code list value help comprises a list of codes each representing value help for an item at the user interface, and wherein the cache includes a plurality of code lists each including a code header, a code value, and a code description.

8. The computer-readable medium of claim 1, further comprising:
   replicating a plurality of code lists from a persistent repository into the cache to enable access to the plurality of code lists by the code list provider accessing the cache.

9. The computer-readable medium of claim 1, further comprising:
   selecting at least one of the code lists based on a switch table.

10. A computer-implemented method comprising:
    receiving, at a code list provider at a server, a request from a user interface for code list value help;
    determining, based on the request, a location for the code list value help in at least one of a cache or a storage source for one or more business objects, wherein when the determining indicates the storage source for one or more business objects, the determining further comprises determining whether the one or more business objects are active and stored in a buffer or inactive and stored in a persistent storage, wherein the cache is implemented in memory, wherein the cache includes at least 70% of information for providing code lists to the code list provider to enable retrieval directly from the cache, and wherein the secondary storage includes remaining information for providing code lists to the code list provider;
    accessing the cache including a first code list, when the determination results in access to the cache;
    accessing the buffer including a second code list, when the determination results in access to the buffer;
    accessing the persistent storage including a third code list, when the determination results in access to the persistent storage; and
    sending, by the code list provider, at least one of the first code list, the second code list, or the third code list to the user interface to enable the user interface to provide code list value help.

11. The computer-implemented method of claim 10, wherein the request includes a value help request for an element at the user interface.

12. The computer-implemented method of claim 10, wherein the memory comprises at least one of a random access memory, a dynamic random access memory, or a flash memory.

13. The computer-implemented method of claim 10, wherein the secondary storage comprises a disk-based storage mechanism.

14. A system comprising:
    at least one processor; and
    at least one memory including code which when executed by the at least one processor cause the system to provide operations comprising:
    receiving, at a code list provider at a server, a request from a user interface for code list value help;
    determining, based on the request, a location for the code list value help in at least one of a cache or a storage source for one or more business objects, wherein when the determining indicates the storage source for one or more business objects, the determining further comprises determining whether the one or more business objects are active and stored in a buffer or inactive and stored in a persistent storage, wherein the cache is implemented in memory, wherein the cache includes at least 70% of information for providing code lists to the code list provider to enable retrieval directly from the cache, and wherein the secondary storage includes remaining information for providing code lists to the code list provider;

accessing the cache including a first code list, when the determination results in access to the cache;

accessing the buffer including a second code list, when the determination results in access to the buffer;

accessing the persistent storage including a third code list, when the determination results in access to the persistent storage; and sending, by the code list provider, at least one of the first code list, the second code list, or the third code list to the user interface to enable the user interface to provide code list value help.

15. The system of claim 14, wherein the request includes a value help request for an element at the user interface.

16. The system of claim 14, wherein the memory comprises at least one of a random access memory, a dynamic random access memory, or a flash memory.

17. The system of claim 14, wherein the secondary storage comprises a disk-based storage mechanism.

\* \* \* \* \*